May 18, 1965     G. P. TROMBLEY     3,183,987

SNOW VEHICLE HAVING DEMOUNTABLE CRAWLER TREADS

Filed Oct. 9, 1962     3 Sheets-Sheet 1

Gerald P. Trombley
INVENTOR.

BY *Clarence A. O'Brien*
*and Harvey B. Jacobson*
Attorneys

May 18, 1965 G. P. TROMBLEY 3,183,987
SNOW VEHICLE HAVING DEMOUNTABLE CRAWLER TREADS
Filed Oct. 9, 1962 3 Sheets-Sheet 2

Gerald P. Trombley
INVENTOR.

May 18, 1965 G. P. TROMBLEY 3,183,987
SNOW VEHICLE HAVING DEMOUNTABLE CRAWLER TREADS
Filed Oct. 9, 1962 3 Sheets-Sheet 3
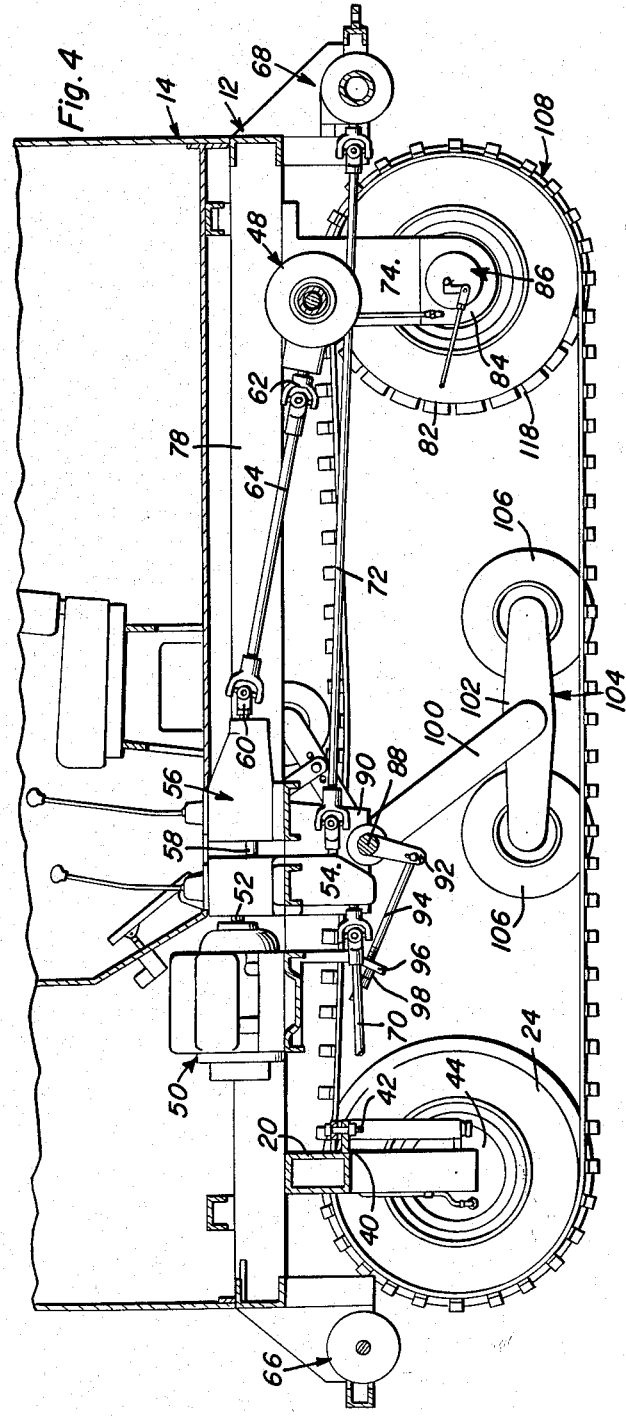
Gerald P. Trombley
INVENTOR.

United States Patent Office

3,183,987
Patented May 18, 1965

3,183,987
SNOW VEHICLE HAVING DEMOUNTABLE
CRAWLER TREADS
Gerald P. Trombley, New Hyde Park, N.Y.
(9 N. Maryland Ave., Port Washington, N.Y.)
Filed Oct. 9, 1962, Ser. No. 229,393
4 Claims. (Cl. 180—6.24)

This invention relates to a novel and useful combination snow vehicle which is provided with demountable crawler treads.

The snow vehicle of the instant invention is constructed in a manner closely resembling the general construction of conventional types of vehicles and is provided wtih a pair of front opposite side dirigible wheels and a pair of rear driving wheels to which a suitable prime mover is drivingly connected. The snow vehicle of the instant invention is constructed in a manner whereby endless crawler-type treads may be entrained about the front and the rear wheels on each side of the vehicle and the steering mechanism for the dirigible front wheels is provided with means by which the front wheels may be locked in adjusted position with the front wheels disposed in straightforward positions. In addition, the snow vehicle has at least one pair of wheels thereof provided with conventional braking assemblies and the driving wheels of the vehicle are further provided with individual clutching and braking assemblies whereby the driving wheels may be individual braked thereby enabling the snow vehicle, when the demountable crawler treads are mounted thereon, to be steered in the same manner a crawler tractor type of vehicle is steered.

The main object of this invention is to provide a snow vehicle designed primarily for traveling over snowy terrain. While some types of very deep and soft snows will necessitate the use of the demountable crawler treads on the snow vehicle of the instant invention, it is conceivable that other types of snow such as hard packed snow usually found on road surfaces, will not require the use of crawler type treads which of course limit the speed at which the snow vehicle may be driven. In addition, the mounting of crawler treads on a vehicle gives rise to steering problems inasmuch as the vehicle must then be steered as though it were a crawler type tractor. However, inasmuch as the snow vehicle of the instant invention is provided with demountable crawler treads and is otherwise constructed in a manner closely resembling a conventional motor vehicle, the demountable crawler treads may be readily removed when they are not needed in order that the snow vehicle may then travel over roads and snowy terrain not requiring demountable crawler treads for traction in the conventional manner. Inasmuch as the snow vehicle of the instant invention, when its demountable crawler treads are removed, may be steered in the conventional manner, it may be driven at higher speeds and with less steering effort.

A further object of this invention, in accordance with the immediately preceding object, is to provide the snow vehicle of the instant invention with a bogie wheel assembly for each of the demountable crawler treads in order that the lower reach of the crawler treads may more evenly support the weight of the vehicle and the center of the lower reach of each of the crawler treads may be guided against excessive lateral deflection.

Still another object of this invention, in accordance with the immediately preceding object, is to provide means for mounting the bogie wheel assemblies for movement in a plane containing the corresponding endless track assembly toward and away from engagement with the lower reach of the corresponding track assembly from the inside thereof and with means being provided for yieldably urging the bogie wheel assembly toward engagement with the lower reach of the endless track assembly.

A final object of this invention to be specifically enumerated herein is to provide a snow vehicle in acordance with the preceding objects which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary longitudinal sectional view taken substantially upon the plane indicated by the section line 4—4 of FIGURE 3;

FIGURE 5 is a fragmentary side elevational view of the rear portion of the snow vehicle showing the driving wheel thereof with the demountable crawler treads removed;

FIGURE 6 is an enlarged fragmentary sectional view taken substantially upon the plane indicated by the section line 6—6 of FIGURE 5; and FIGURE 7 is an enlarged fragmentary sectional view taken substantially upon the plane indicated by the section line 7—7 of FIGURE 6.

Figure 1:
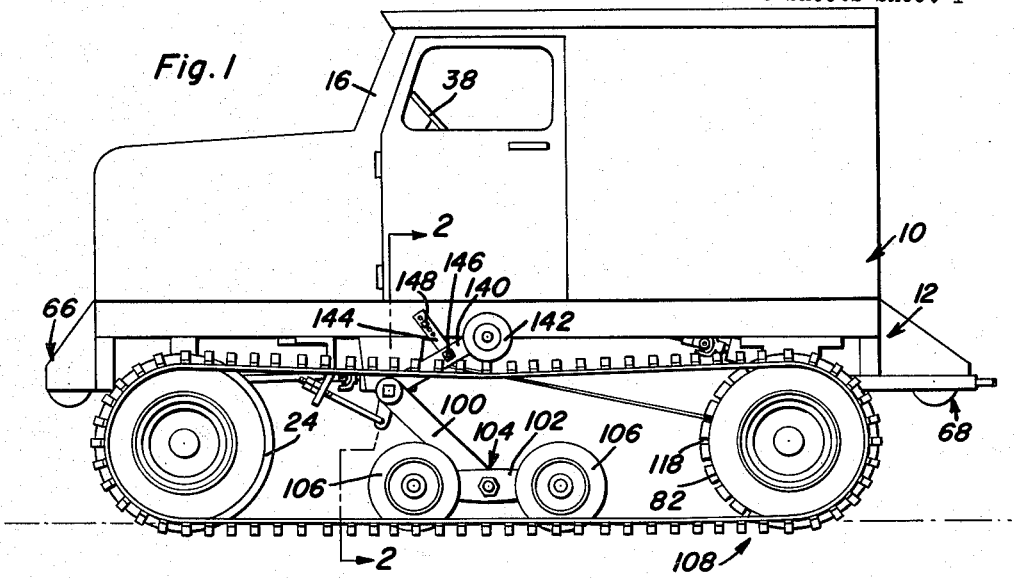
FIGURE 1 is a side elevational view of the snow vehicle of the instant invention.
Figure 2:
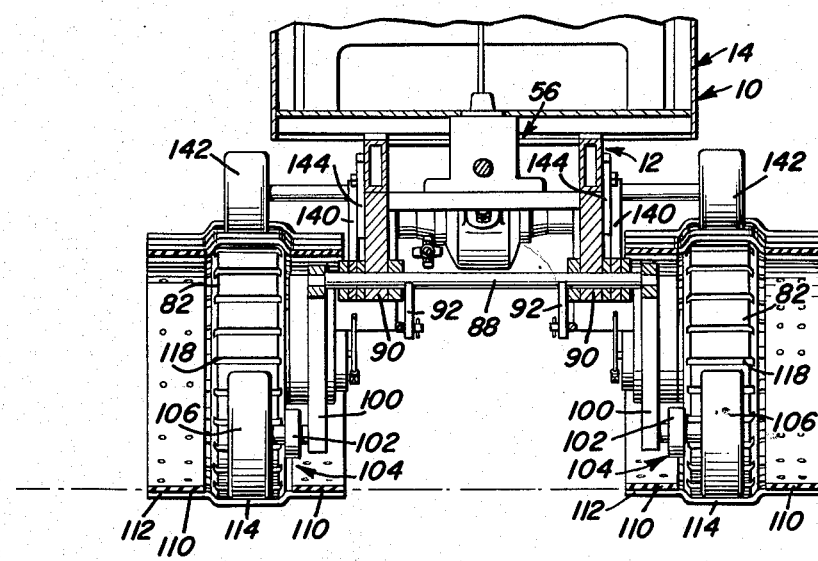
FIGURE 2 is an enlarged fragmentary transverse vertical sectional view taken susbtantially upon the plane indicated by the section line 2—2 of FIGURE 1.

Referring now more specifically to the drawings the numeral 10 generally designates the snow vehicle of the instant invention. The vehicle 10 comprises a main frame generally referred to by the reference numeral 12 and a body generally referred to by the reference numeral 14 including a cab portion 16.

Figure 3:
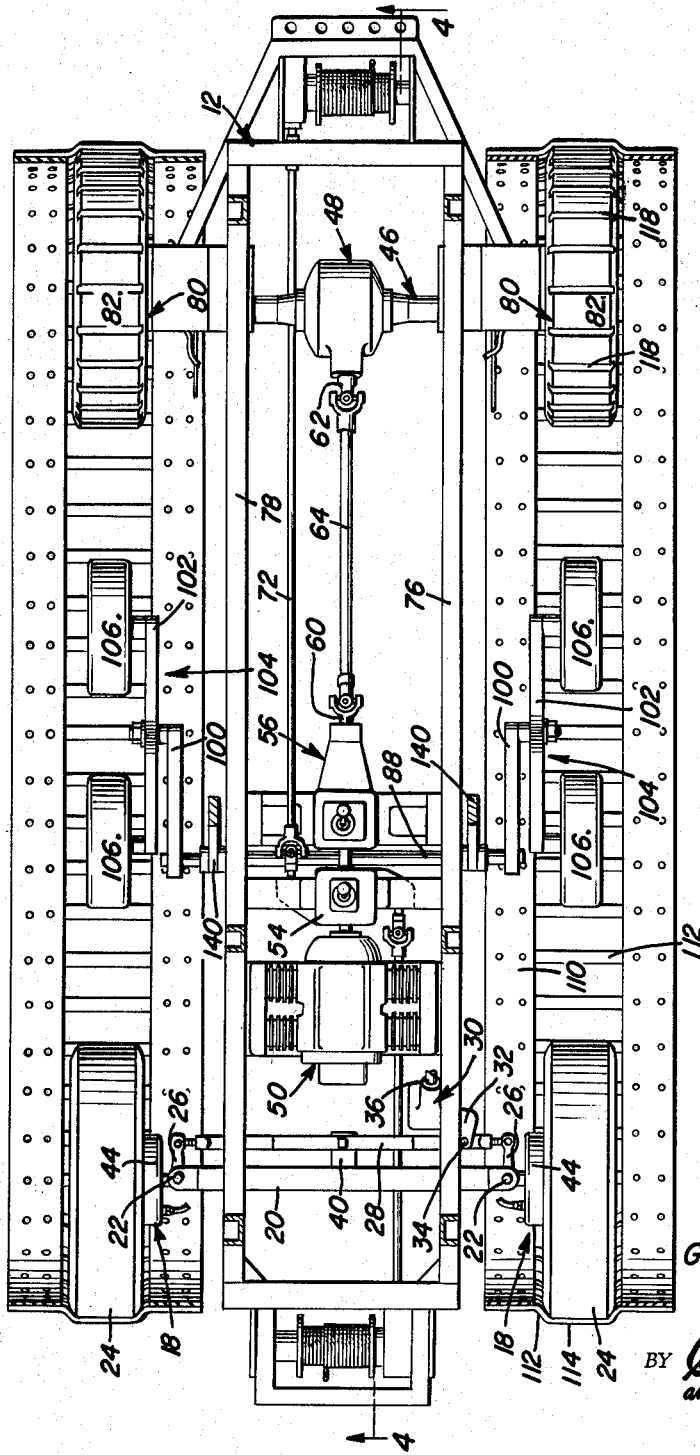
FIGURE 3 is a horizontal sectional view of the snow vehicle on somewhat of an enlarged scale and taken upon a plane passing through the horizontal centerlines of the endless track assemblies and disposed at approximately seat level along the longitudinal centerline of the vehicle.

A pair of dirigible front wheel assemblies 18 are pivotally supported from a front transverse member 20 of the frame 12 by means of kingpins 22. Each of the front wheel assemblies includes a spindle (not shown) on which a wheel 24 is rotatably mounted and each spindle includes a steering arm 26. The steering arms are interconnected by means of a tie rod 28 and a steering gear box generally referred to by the reference numeral 30 includes a steering arm 32 which is pivotally secured to the tie rod 28 by a pivot pin 34 at its free end. A steering wheel shaft 36 is geared to the steering arm 32 within the steering gear box 30 and a steering wheel 38 is secured to the upper end of the steering wheel shaft 36. From FIGURE 3 of the drawings it may be seen that the front transverse member 20 has a bracket plate 40 secured thereto in any convenient manner and that the tie rod 28 may be fixed relative to the bracket plate 40 by means of a lockpin fastener 42 secured through appropriate apertures formed in the tie rod 28 and the bracket plate 40. In this manner, the front wheel assemblies 18 may be locked in the straightforward positions.

The front wheel assemblies 18 include conventional hydraulic brake assemblies 44 which may be actuated by a conventional type of actuator controlled master cylinder (not shown).

An axle assembly generally referred to by the reference numeral 46 is rigidly supported from the rear portion of the frame 12 and includes a locked differential assembly generally referred to by the reference numeral 48. A prime mover generally referred to by the reference numeral 50 is supported from a forward portion of the main frame 12 and is provided with an output shaft 52 to which a power take-off assembly 54 is drivingly connected. A conventional type of transmission generally referred to by the reference numeral 56 is provided and is driven from the output shaft 58 of the power take-off 54 and the output shaft 60 of the transmission 56 is drivingly connected to the input shaft 62 of the differential 48 by means of a drive shaft 64.

Front and rear winch assemblies generally referred to by the reference numerals 66 and 68 are supported from the frame 12 and are drivingly connected to the power take-off 54 by means of drive shafts 70 and 72 respectively.

A pair of hollow depending supports 74 are supported from the rear end portions of the opposite longitudinal side members 76 and 78 of the frame 12 and a rear driving wheel assembly generally referred to by the reference numeral 80 is supported from the lower end of each support 74. Each driving wheel assembly rotatably supports a rear driving wheel 82 and includes a conventional hydraulic brake assembly 84 and a separate clutching and braking assembly generally referred to by the reference numeral 86, see FIGURE 4. The hydraulic brake assemblies 84 may be operatively connected to the same master cylinder (not shown) which operate the front hydraulic brake assemblies 44 and the clutching and brake assemblies 86 may each be provided with a separate control (not shown) for selectively declutching and braking each rear driving wheel 82.

A torsion rod 88 is journaled for rotation by means of a pair of hanger brackets 90 dependingly supported from the longitudinal side frame members 76 and 78 and the opposite ends of the torsion rod 88 are provided with crank arms 92 which are fixedly secured thereto. Corresponding ends of a pair of adjusting rods 94 are pivotally secured to the free ends of the crank arms 92 and the other pair of ends of the adjusting rods 94 are secured through a pair of hanger brackets 96 supported from the frame 12 by means of threaded fasteners 98.

The terminal end portions of the torsion rod 88 have a pair of crank arms 100 secured thereto and the free end of each arm 100 is pivotally secured to the mid-portion of the support beam 102 of a bogie wheel assembly generally referred to by the reference numeral 104. The opposite ends of each support beam 102 have bogie wheels 106 rotatably supported therefrom.

An endless track assembly generally referred to by the reference numeral 108 is entrained about the front and rear wheels 24 and 82 on each side of the vehicle 10 and each endless track assembly comprises a pair of generally parallel and endless flexible tension members 110 which are interconnected by means of a plurality of generally parallel rigid strap-like members 112. Each rigid strap-like member includes a bowed mid-portion 114 which opens inwardly of the endless track assembly and the bowed portions 114 of each endless track assembly define a groove in which the corresponding front and rear wheels 24 and 82 track.

It will be noted that the bogie wheels 106 also track in the groove defined by the bowed mid-portions 114.

With attention now directed to FIGURES 3-7 of the drawings, it may be seen that each of the rear driving wheels 82 is provided with a plurality of transversely extending and radially outwardly opening grooves 118. Each rear driving wheel 82 has an anti-skid cross chain 120 removably secured thereto and each cross chain comprises a plurality of radially inwardly opening and generally U-shaped members 122 which each includes a pair of generally parallel legs 124 and 126 interconnected at corresponding ends by means of a bight portion 128.

Each of the bight portions 128 includes a flange portion 130 which is seatingly received in the corresponding one of the grooves 118 and the free ends of the legs 124 and 126 are provided with eye portions 132 which are secured about annular tension members 134 which are utilized to interconnect the free ends of corresponding legs of each set of generally U-shaped members 120.

With attention now directed to FIGURES 1 and 4 of the drawings it may be seen that each end of the torsion rod 88 has one end of a swing arm 140 pivotally secured thereto. The other end of each of the swing arms 140 has an idler wheel 142 rotatably journaled thereon and each idler wheel 142 is engageable with the outer surface of the corresponding endless track assembly. An adjustable brace arm 144 is pivotally secured to each of the swing arms 140 as at 146 and may be secured at points spaced longitudinally therealong to the main frame 12 by means of a fastener 148. It is of course to be understood that the idler wheels 142 may be utilized to maintain proper tension on the endless track assemblies and that each of the swing arms 140 is adjustable independently of the other swing arm.

In operation, and with the endless track assemblies removed, the bogie wheel assemblies 104 may be removed together with the crank arms 100. With the endless track assemblies removed and the fastener 42 removed, the vehicle 10 may be driven over road surfaces in the conventional manner with each of the rear driving wheels 82 drivingly connected to the prime mover 50. However, when extremely deep and soft snow is encountered, the endless track assemblies may be applied to the vehicle 10 in order that it will be able to travel easily over the soft snow. With the endless track assembly applied, the conventional hydraulic brake assemblies 42 and 44 together with the hydraulic brake assemblies 84 need not be used inasmuch as the clutch and brake assemblies 86 will serve to both steer and stop the vehicle 10.

It is to be noted that the anti-skid cross chains may be either removed or installed when the vehicle 10 is in use either with or without the endless track assemblies installed. In addition, by placing the winch assemblies 66 and 68 on opposite ends of the vehicle, the vehicle 10 may winch itself out of a position in which it has been stuck.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination vehicle comprising a main frame, a pair of opposite side rear wheels dependingly journaled for rotation from the rear end portion of said frame, a pair of opposite side dirigible front wheels dependingly journaled for rotation from the forward end portion of said frame, steering means interconnecting said dirigible front wheels for simultaneous steering, motor means supported from said frame and drivingly connected to one pair of said wheels, the last-mentioned pair of wheels each including clutch and brake means for selectively declutching said last-mentioned wheels from driven connection with said motor means and braking said last-mentioned wheels, said one pair of said wheels also including additional brake means for simultaneously braking said one pair of wheels, a pair of endless track members removably entrained over corresponding ones of said front and rear wheels, and said steering means including means for locking said dirigible wheels in adjusted position, a bogie wheel assembly dependingly supported from each side of said frame for movement in a plane containing the corresponding front and rear wheels toward and away from engagement with the lower reach of the corresponding track member from the inside thereof, and means yieldably urging said bogie wheel assemblies toward engagement with said lower reaches, said vehicle also including an idler tension wheel for each of said endless track members swingably supported from said frame for adjustable vertical movement in a plane containing the corresponding track member and toward and away from the upper reach thereof from outside the corresponding track member.

2. A combination vehicle comprising a main frame, a pair of opposite side rear wheels dependingly journaled for rotation from the rear end portion of said frame, a pair of opposite side dirigible front wheels dependingly journaled for rotation from the forward end portion of said frame, steering means interconnecting said dirigible front wheels for simultaneous steering, motor means supported from said frame and drivingly connected to one pair of said wheels, the last-mentioned pair of wheels each including clutch and brake means for selectively declutching said last-mentioned wheels from driven connection with said motor means and braking said last-mentioned wheels, said one pair of said wheels also including additional brake means for simultaneously braking said one pair of wheels, a pair of endless track members removably entrained over corresponding ones of said front and rear wheels, said endless track members being completely disposed below the horizontal medial plane of said main frame, and said steering means including means for locking said dirigible wheels in adjusted position, a bogie wheel assembly dependingly supported from each side of said frame for movement in a plane containing the corresponding front and rear wheels toward and away from engagement with the lower reach of the corresponding track member from the inside thereof, and means yieldably urging said bogie wheel assemblies toward engagement with said lower reaches, said vehicle also including an idler tension wheel for each of said endless track members swingably supported from said frame for adjustable vertical movement in a plane containing the corresponding track member and toward and away from the upper reach thereof from outside the corresponding track member.

3. A combination vehicle comprising a main frame, a pair of opposite side rear wheels dependingly journaled for rotation from the rear end portion of said frame, a pair of opposite side dirigible front wheels dependingly journaled for rotation from the forward end portion of said frame, steering means interconnecting said dirigible front wheels for simultaneous steering, motor means supported from said frame and drivingly connected to one pair of said wheels, the last-mentioned pair of wheels each including clutch and brake means for selectively declutching said last-mentioned wheels from driven connection with said motor means and braking said last-mentioned wheels, said one pair of said wheels also including additional brake means for simultaneously braking said one pair of wheels, a pair of endless track members removably entrained over corresponding ones of said front and rear wheels, said endless track members being completely disposed below the horizontal medial plane of said main frame, and said steering means including means for locking said dirigible wheels in adjusted position, at least the first-mentioned one pair of wheels have transversely extending and radially outwardly opening grooves formed therein and spaced circumferentially about their outer peripheries, and a pair of anti-skid cross chains removably secured to each wheel and each comprising a plurality of radially inwardly opening generally U-shaped members each including a pair of generally parallel legs interconnected at one pair of corresponding ends by means of a bight portion, said bight portions each including a portion keyed in a corresponding one of said grooves, the free ends of the corresponding legs of each of said U-shaped members being secured to a generally annular tension member at points spaced longitudinally there along.

4. The combination of claim 3 wherein said endless track members each comprise a pair of endless parallel tension members interconnected by means of a plurality of generally parallel rigid strap-like members, said strap-like members including bowed mid-portions disposed between the corresponding tension members which open inwardly of said track members and define grooves in which said front and rear wheels track.

References Cited by the Examiner
UNITED STATES PATENTS

| 1,437,408 | 12/22 | Estes | 305—20 X |
| 2,383,873 | 8/45 | Macpherson | 180—44 X |
| 2,559,944 | 7/51 | Chapp | 74—710.5 |
| 2,698,667 | 1/55 | Kropp | 180—6.7 X |
| 2,861,642 | 11/58 | Hacker | 305—27 |
| 2,961,057 | 11/60 | Johnson | 180—6.2 |
| 2,992,862 | 7/61 | Fredricks et al. | 305—35 X |
| 2,999,723 | 9/61 | Ostberg et al. | 305—57 |
| 3,028,901 | 4/62 | Batori | 152—239 |

FOREIGN PATENTS

| 478,066 | 10/51 | Canada. |
| 633,211 | 12/61 | Canada. |

ARTHUR L. LA POINT, *Primary Examiner.*